United States Patent
Magnabosco et al.

(10) Patent No.: US 12,384,582 B2
(45) Date of Patent: Aug. 12, 2025

(54) HEATING AND SEALING HEAD FOR PACKAGING MACHINES OF PRODUCTS IN TRAYS

(71) Applicant: BMB S.R.L., Malo (IT)

(72) Inventors: Massimiliano Magnabosco, Torrebelvicino (IT); Sileo Vendraminetto, San Donà di Piave (IT)

(73) Assignee: BMB S.R.L., Malo (IT)

( * ) Notice: Subject to any disclaimer, the term of this patent is extended or adjusted under 35 U.S.C. 154(b) by 107 days.

(21) Appl. No.: 18/273,946

(22) PCT Filed: Jan. 27, 2022

(86) PCT No.: PCT/IB2022/050701
§ 371 (c)(1),
(2) Date: Jul. 24, 2023

(87) PCT Pub. No.: WO2022/162567
PCT Pub. Date: Aug. 4, 2022

(65) Prior Publication Data
US 2024/0083614 A1 Mar. 14, 2024

(30) Foreign Application Priority Data
Jan. 28, 2021 (IT) .................. 102021000001751

(51) Int. Cl.
*B65B 51/14* (2006.01)
*B65B 5/06* (2006.01)
(Continued)

(52) U.S. Cl.
CPC .............. *B65B 51/14* (2013.01); *B65B 5/068* (2013.01); *B65B 7/164* (2013.01); *B65B 51/227* (2013.01)

(58) Field of Classification Search
CPC ......... B65B 51/14; B65B 5/068; B65B 7/164; B65B 51/227
See application file for complete search history.

(56) References Cited

U.S. PATENT DOCUMENTS 3,509,686 A * 5/1970 Bergstrom ............ B65B 31/021
53/511
3,708,949 A * 1/1973 Wilcox .................. G01M 3/227
53/511

(Continued)

FOREIGN PATENT DOCUMENTS

| DE | 102004051923 A1 | 5/2006 | |
| EP | 0469296 A1 * | 2/1992 | ......... B29C 66/8242 |
| EP | 2905233 A1 | 8/2015 | |

OTHER PUBLICATIONS

PCT/IB2022/050701, International Search Report and Written Opinion, dated Apr. 26, 2022.

*Primary Examiner* — Lucas E. A. Palmer
(74) *Attorney, Agent, or Firm* — Troutman Pepper Locke LLP (57) ABSTRACT

A heating and sealing head (1) for packaging machines ($M_1$; $M_2$; $M_3$) of products in trays (V), comprising a fixed support group (2) provided with first actuation means (3) electrically connected to a pneumatic system (4) for delivering compressed air, and a mobile application group (5) mechanically coupled to the fixed support group (2) by means of first fixing means and comprising heating means (6) electrically connected to an electric current generator (7), preferably alternating, which activates the heating means (6) to produce heat useful for sealing a closing and packaging film to one or more trays for containing products when the trays themselves are arranged under the heating and sealing head (1) in a packaging machine ($M_1$; $M_2$; $M_3$). In particular, the heating means (6) comprise an electromagnetic inductor (Continued)

body (8) which produces the heat due to the effect of the parasitic electric currents induced by a magnetic field generated by the electromagnetic inductor body (8) when crossed or affected by the electric current.

15 Claims, 8 Drawing Sheets (51) Int. Cl.
  *B65B 7/16* (2006.01)
  *B65B 51/22* (2006.01)

(56) References Cited

U.S. PATENT DOCUMENTS

| | | | | |
|---|---|---|---|---|
| 3,908,334 | A * | 9/1975 | Rychiger | B65B 31/028 |
| | | | | 53/86 |
| 4,217,156 | A * | 8/1980 | Slungaard | B29C 66/12441 |
| | | | | 156/275.3 |
| 4,650,535 | A * | 3/1987 | Bennett | B29C 66/8742 |
| | | | | 493/207 |
| 4,697,401 | A * | 10/1987 | Kessler | B29C 66/244 |
| | | | | 53/201 |
| 4,909,022 | A * | 3/1990 | Kubis | B65B 51/227 |
| | | | | 53/DIG. 2 |
| 4,941,306 | A * | 7/1990 | Pfaffmann | B29C 66/72321 |
| | | | | 53/DIG. 2 |
| 5,077,954 | A * | 1/1992 | Williams | B65B 31/021 |
| | | | | 53/329.3 |
| 5,155,971 | A * | 10/1992 | Zopf | B65B 31/04 |
| | | | | 53/477 |
| 5,755,907 | A * | 5/1998 | Spatafora | B65B 51/227 |
| | | | | 156/218 |
| 6,092,643 | A * | 7/2000 | Herzog | B29C 66/72321 |
| | | | | 198/444 |
| 6,153,864 | A * | 11/2000 | Hammen | H05B 6/103 |
| | | | | 53/DIG. 2 |
| 6,843,043 | B2 * | 1/2005 | Hanson | B65B 25/041 |
| | | | | 53/512 |
| 6,976,347 | B2 * | 12/2005 | Karman | B65B 25/062 |
| | | | | 53/431 |
| 7,976,885 | B2 * | 7/2011 | Pulsfus | A23B 2/7045 |
| | | | | 53/433 |
| 9,003,746 | B2 * | 4/2015 | Holzem | B29C 66/8167 |
| | | | | 53/329.2 |
| 9,174,751 | B2 * | 11/2015 | Grobbel | B65B 9/045 |
| 9,937,627 | B2 * | 4/2018 | Regan | B25J 15/0061 |
| 11,214,394 | B2 * | 1/2022 | Palumbo | B29C 66/91445 |
| 11,459,137 | B2 * | 10/2022 | Mader | B65B 31/028 |
| 2001/0032839 | A1 * | 10/2001 | Herzog | B29C 65/3668 |
| | | | | 219/656 |
| 2004/0250515 | A1 * | 12/2004 | Rimondi | B65B 31/044 |
| | | | | 53/551 |
| 2005/0224184 | A1 * | 10/2005 | Hammen | B29C 66/24221 |
| | | | | 156/380.2 |
| 2010/0107568 | A1 * | 5/2010 | Inaba | B29C 66/83423 |
| | | | | 53/370.7 |
| 2013/0105467 | A1 * | 5/2013 | Morin | B65B 51/227 |
| | | | | 219/603 |
| 2014/0102051 | A1 * | 4/2014 | Huang | B65B 31/048 |
| | | | | 53/512 |
| 2016/0264270 | A1 * | 9/2016 | Brozell | B65B 7/2878 |
| 2016/0355283 | A1 * | 12/2016 | Capitani | B65B 7/164 |
| 2017/0036797 | A1 * | 2/2017 | Israelsson | B29C 66/72328 |
| 2020/0071012 | A1 * | 3/2020 | Mößnang | B65B 41/06 |
| 2021/0122513 | A1 * | 4/2021 | Rizzi | B65B 31/046 |
| 2023/0234739 | A1 * | 7/2023 | Pinyayev | B65B 53/063 |

* cited by examiner

HEATING AND SEALING HEAD FOR PACKAGING MACHINES OF PRODUCTS IN TRAYS

This application is a national stage application under 35 U.S.C. § 371 of PCT Application No. PCT/IB2022/050701, filed 27 Jan. 2022, which claims the priority benefit of Italian Patent Application No. 102021000001751, filed 28 Jan. 2021, each of which is incorporated by reference herein in its entirety.

The present invention relates to a heating and sealing packaging head (or cylinder-head) for packaging machines, such as, for example the machines known in technical jargon of the field as heat sealing machines and thermoforming machines, of preformed trays or trays formed from film directly in the machine, not only and conventionally containing food products but also other objects such as nails, biomass wood material (chips), medical products, and so on.

Packaging machines, themselves and in turn the object of the invention herein described, are of the type capable of operating both in modified when vacuum atmosphere or, further alternatively, in simple sealing (definable also as "packaging in free air").

As known, in order to package products in trays, for example a preformed tray made of various materials (polyethylene, (PET), polypropylene (PP), polystyrene (PS), aluminum, paperboard), such as food products in particular, to be made available to the user predominantly by means of large retailers and retail shops, the related industrial field employs packaging machines, for the most part known as thermoforming machines or heat sealing machines.

For example, food products contained in trays such as fresh pasta, fresh stuffed pasta (ravioli), gnocchi, ready meals, bakery products, pizzas, flatbread, wraps, polenta, purées, snacks, sliced cured meats, sliced cold cuts, dairy products (such as burrata or ricotta cheese), sliced cheese, soft cheese, spreadable cheese, olives, fruit, vegetables, cakes, yogurt, honey, sandwiches, meat, fish, croissants, dried fruit, and so on, may be packaged by means of such packaging machines.

More in detail, heat sealing machines are automated and semi-automated machines used to vacuum package food products in modified (or controlled or protective) atmosphere, with a so-called "skin" effect or with simple sealing.

It should be noted that the packaging used by the technology with a so-called "skin" effect provides using a particular film which, adequately processed by the packaging machine, perfectly adheres to the product by virtue of the vacuum, thus creating a kind of invisible second skin.

In machines with sealing alone and vacuum with the contribution of gas, the film is sealed only on the edge of the tray, while for the machines with a "skin" effect, the sealing of the film occurs not only on the edge of the tray, but also on the bottom and about the product so as to prevent any release of liquid and keep the appearance of the package impeccable.

A heat sealing packaging machine of the known type generally comprises the following constructive assemblies:
- support frame;
- moving group for the packaging tray;
- supporting surface for the preformed trays to be packaged, varying in number from 1 to 4 per packaging cycle, according to the needs and requirements of the clients;
- moving group for the preformed trays to be packaged;
- outlet assembly (formed by a slide, roller conveyor or motorized belt) of the packaged trays;
- packaging tray, usually open;
- packaging head arranged above the packaging tray and usually spaced apart therefrom, in non-operating conditions of the machine;
- operating panel;
- unwinding assembly (or unwinder);
- waste winding assembly (or winder);
- phonic wheel;
- pneumatic and vacuum system;
- electric system.

The support frame generally is made of stainless steel, while certain functional components are made of anodized aluminum and plexiglass: the overall assembly formed by the frame and components is mounted on rollers with brakes.

The preformed trays containing the related product, to be packaged and arranged on the supporting surface (placed side-by-side if there is more than one), are conveyed between the packaging tray and the packaging head through a drive system of the chain-rod type moved by a geared motor. In the successive step, by actuating the moving group of the packaging tray, the preformed trays are raised by the packaging tray up to bringing them against the packaging head.

Similarly, to the preformed trays, also the closing and packaging film (made, for example of polypropylene (PP) or polyethylene (PE) or composite plastic material, such as polyamide (PA) combined with polyethylene (PE)) is unwound from the related reel and dragged between the packaging tray and the packaging head by the waste winding assembly and the unwinding assembly.

When the packaging head substantially is close to the packaging tray up to closing the latter, the pneumatic system applies the vacuum and possibly introduces the inert gas into the tray being packaged; then the film is sealed onto the trays which, thus packaged, are trimmed with a mechanical blade cut.

Then the packaging tray and packaging head system is so to speak opened, the packaged trays are conveyed to the outlet assembly of the machine, while other preformed trays to be packaged are loaded and conveyed to the head-tank system of the machine to be subjected to the same operations as the preceding ones just packaged.

Likewise, the cut closing and packaging film is removed from the actual packaging area of the preformed trays of the machine and wound in a winder, while the part of film useful for the new packaging step is unwound from the unwinding assembly.

For their part, thermoforming machines are machines for the packaging, only in sealing, vacuum and/or modified (or controlled or protective) atmosphere, of material generally in trays which are formed from plastic film directly in the machine itself.

Like the heat sealing machines, also the thermoforming machines are packaging machines comprising various assemblies which may differ from one machine to the next, for example according to the dimensions of the loading station of the preformed trays filled with related product.

In any case, a thermoforming packaging machine of the known type commonly, preferably and generally comprises the following assemblies:
- support frame;
- lower unwinding assembly;
- upper unwinding assembly;
- preheating plate assembly;
- forming head and tank assembly;
- loading station of the preformed tray containing the product;
- operating panel;

electrical panel;
packaging head and packaging tray assembly;
transverse cutting assembly;
longitudinal cutting assembly;
shaped cutting assembly;
removal assembly of the packaged preformed tray;
safety guards;
closing and packaging film dragging assembly;
production format assemblies (forming wedges and buffers, package supports at the loading stations of the product to be introduced into the trays and sealing cooling area, sealing plate, blades, dies and longitudinal and transverse cutting counter);
waste removal assembly (by means of waste-suction mouths or motorized winder);
separating assembly of each individual package just obtained.

Very briefly, once switched ON, the operation of a thermoforming packaging machine initially provides automatically emptying the first film reel arranged in the lower unwinding assembly.

By virtue of a pair of chains which grip the film at the ends, the latter is dragged for the whole length of the support frame of the thermoforming machine, preferably first passing through the preheating assembly, where it is heated.

The heated film of the first reel is then positioned on the forming assembly where the trays to contain the product to be packaged are directly created using such a film.

Should the thermoforming packaging machine not provide the preheating assembly, the aforesaid film is directly heated in the forming assembly.

The formed trays thus obtained are then placed in the loading area in which the product is introduced into the trays and then conveyed to the packaging assembly. In this step, the preformed trays are suctioned and if required, filled with inert gas, and then sealed by means of the film originating from the upper unwinding assembly, where the second film reel is positioned.

Then the packaged preformed trays closed with the film of the second reel are positioned in the cutting area where they are separated by means of the transverse cutting assembly, shaped cutting assembly and longitudinal cutting assembly, thus obtaining the end packages ejected from the thermoforming machine by means of the conveyor belt or a simple slide.

The waste produced during the cutting of the packages is collected through the waste removal assembly (such as a waste-suction can or motorized winder).

The packaging machines involved in the present invention such as the mentioned heat sealing machines and thermoforming machines therefore have certain essential elements in common, one of which certainly consisting of the heating and sealing head (or cylinder-head).

In particular, a heating and sealing head for packaging machines of the background art comprises a fixed support group provided with actuation means operatively connected to a pneumatic system for delivering compressed air, and a mobile application group mechanically coupled to the fixed support group by means of first fixing means and comprising heating means electrically connected to an electric current generator which activates the heating means to produce heat useful to sealing a closing and packaging film to one or more preformed trays for containing products when the preformed trays are arranged under the heating and sealing head in the packaging machine.

Examples of known packaging machines—whether they are heat sealing machines or thermoforming machines and processing a reel-originating or pre-cut film—provided with a heating and sealing head of the type generically described above are shown in prior art documents published under numbers EP0469296 A1, DE102004051923 A1 and EP2905233 A1.

Albeit effective from an operational viewpoint, the heating and sealing heads expressly provided and intended for packaging machines have certain recognized drawbacks due in particular to the heating means implemented, commonly one or more electric resistances of any shape and size, which heat the sealing plates by conduction.

Indeed, this type of heating means firstly causes an increase in weight of the heating and sealing head as well as the overall dimensions of the packaging machine, which have a negative impact during transport, handling, assembly and installation at the production facility.

Secondly, the specific composition of the heating means of the heating and sealing heads available on the market today, mounted in a packaging machine of products in preformed trays, results in an excessive, or in any case non-optimal, consumption of electrical energy, which is to be optimized in order to effectively carry out the function thereof.

The assembly for sealing containers by means of induction sealing described in prior art document EP0469296 A1 is not exempt from this second drawback, in which indeed the transfer of heat by induction to the composite and multilayer membrane (numbered with 55) intended to close container 15 received in the containment basket 12 occurs in a punctiform, or in any case, circumscribed manner caused by the presence of a single induction reel 71 provided with electric current generated by a high frequency energy source, conventionally between 30 KHz and MHz (numbered with 76).

Thirdly, the heating and sealing heads of the current state of the art, for packaging machines certainly have a non-optimal and improvable calorimetric performance due to the type of heating means used (electric resistance, in this regard, see in particular prior document DE102004051923 A1).

Therefore, the present invention suggests remedying the aforesaid disadvantages starting from the awareness of the aforesaid drawbacks suffered by the prior art considered hereto.

Particularly, it's a primary purpose of the current invention to provide a heating and sealing packaging head for packaging machines of products in preformed trays or trays directly obtained in machine, which in view of the constructive concept thereof and not so much the materials employed, has a lesser weight and smaller overall dimensions than the equivalent heating and sealing heads of known type.

Within the cognitive sphere of such an object, it is task of the invention to conceive a heating and sealing head for machines for packaging products in preformed trays or trays directly obtained in the machine, which facilitates the handling and installation thereof by the operator with respect to the heating and sealing heads currently used in packaging machines.

It is another task of the invention to indicate a heating and sealing packaging head (or cylinder-head) expressly intended for packaging machines of products in trays, which is easier and quicker to assemble with respect to the heating heads of the background art.

It is a further purpose of the present invention to provide a heating and sealing head for packaging machines of products in preformed trays, which has a simpler (in the sense of requiring less mechanical processing) constructive concept, especially at the heating means, with respect to the one of the heating and sealing heads of the known type most closely comparable therewith.

It is another purpose of the present invention to make a heating and sealing head for packaging machines of products in trays, which involves less consumption of electrical energy with respect to similar heating and sealing heads of the prior art, without this having a negative impact on the conventional functionality of the heating head and therefore, on the performance thereof.

In other words, it is an purpose of the invention to create a heating and sealing head, expressly and exclusively for packaging machines of products in trays, which reaches the ideal operating temperature—useful for the sealing operation of the closing and packaging film—in shorter times and with less expenditure of electrical energy than the heating and sealing heads of the background art.

Last but not least, it is an purpose of the invention to realize a heating and sealing head for packaging machines of products in preformed trays or trays directly formed in the machine, which has a decidedly better calorimetric performance with respect to the heating and sealing heads currently available on the market.

The objects indicated are achieved by means of a heating and sealing head for packaging machines of products in preformed trays or trays directly obtained in the machine, as in the accompanying claim 1, to which reference is made for the sake of brevity of disclosure.

Further detailed technical features of the heating and sealing head for packaging machines of products in trays are contained in the corresponding dependent claims.

The aforesaid claims, hereinafter specifically and concretely defined, are intended an integral part of the present description.

Advantageously, the heating and sealing head for packaging machines of products in trays of the invention has a considerably reduced weight and overall dimensions with respect to the heads of the prior art of equal employment.

This favorably by virtue of the fact that the heating means in the heating and sealing head of the invention comprise at least one electromagnetic inductor body which produces the heat (useful, for example for sealing the film on the trays to be packaged) due to the effect of the parasitic electric currents induced by a magnetic field generated by the electromagnetic inductor body when crossed or affected by the electric current.

Equally advantageously, the heating and sealing head for packaging machines of products in preformed trays or trays directly obtained in the machine, of the invention facilitates the operations for the assembly thereof by the operator, and especially the handling and installation thereof.

Again advantageously, the heating and sealing head for packaging machines of products in trays of the invention operates effectively but at the same time, results in a decidedly decreased consumption of electrical energy with respect to the equivalent heads of the known type, which can be quantified in about 50% to 60%, by virtue of the above-mentioned specific type of heating means provided.

Just as advantageously, thanks to the induction heating system provided in the head of the invention, a less heat dispersion is created and a subsequent increase in the calorimetric performance is obtained with respect to the known heads comparable therewith, all to the advantage of the decrease in the time for reaching the operating temperature (decreased up to about half, for example if the head operates at 160° C.) and in the time for cooling in comparison to the prior art, in order to allow maintenance, repair or replacement operations of the mobile application group as the format (to be intended as number) of the trays to be packaged varies.

Essentially, thus, the innovation associated with the invention essentially consists of the change of the heat transfer method onto the sealing plates in the heating and sealing head.

As already mentioned, one or more electric resistances are arranged in the heating and sealing head in existing models, which electric resistances are in contact with the sealing plates by means of two further aluminum plates which enclose them in a kind of sandwich structure.

Instead, in the innovative model of the head of the invention, the heating means do not provide electric resistances and include at least one inductor which, when excited by the current generator, originates electromagnetic waves which put the molecules of the ferromagnetic material of an intermediate heat storage plate coupled to the sealing plate, into thermal agitation.

Thereby, the ferromagnetic material of the intermediate heat storage plate heats and yields heat, by conduction, to the sealing plate provided with raised annular ribs (or wedges) which receive the preformed trays or trays directly got in machine. Therefore, in the invention, the electrical energy is transformed first into an electromagnetic field and then into heat.

Said objects and advantages will be more apparent from the following description relating to preferred embodiments of the heating and sealing head (cylinder-head) for packaging machines (such as, preferably but not exclusively, heat sealing machines and thermoforming machines) of products in preformed trays of the invention, given by way of non-limiting example, with reference to the accompanying drawings, in which.

Figure 5:
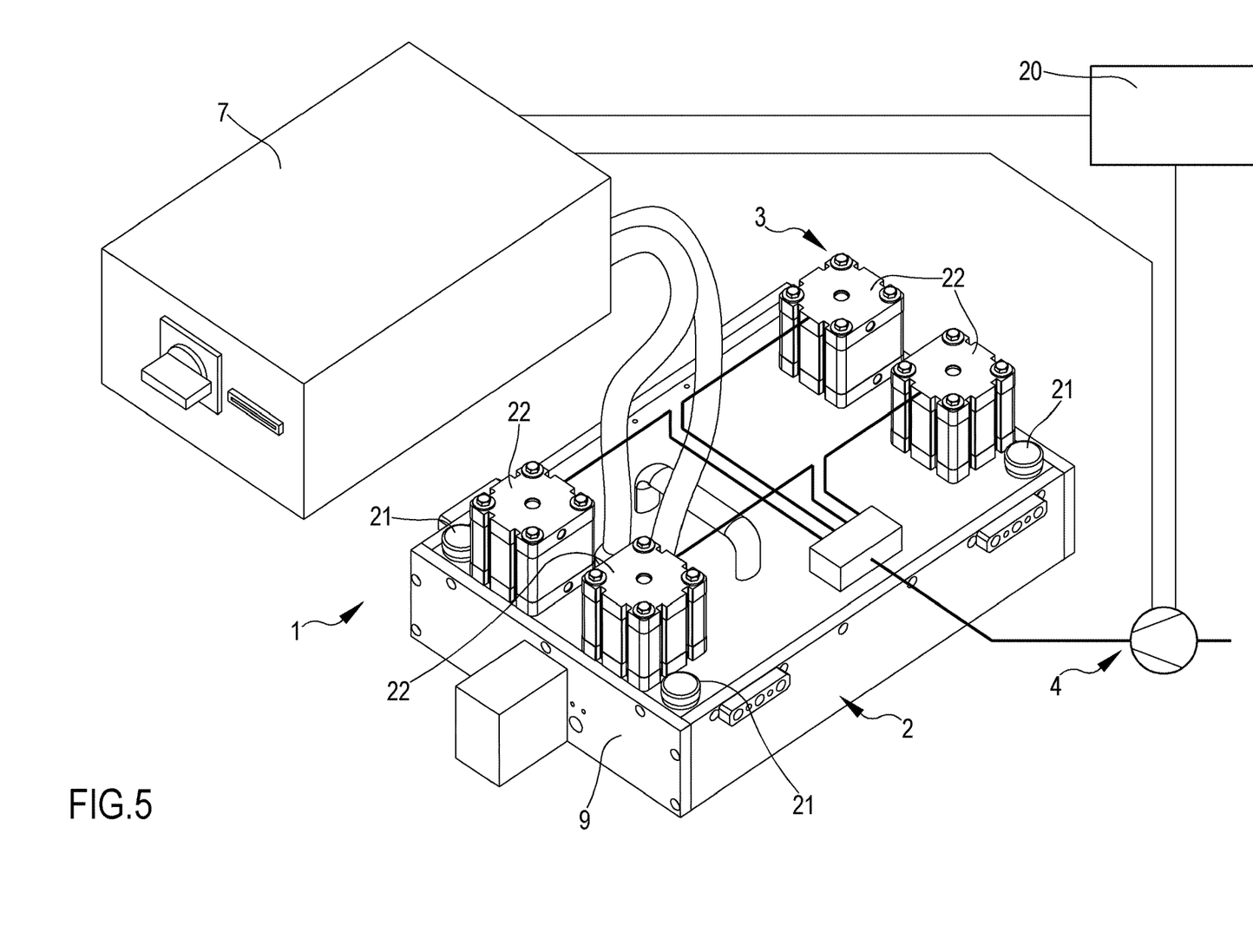
FIG. 5 is a partially simplified axonometric view of the heating and sealing head of the invention, to be installed in the packaging machine in FIG. 1.
Figure 6:
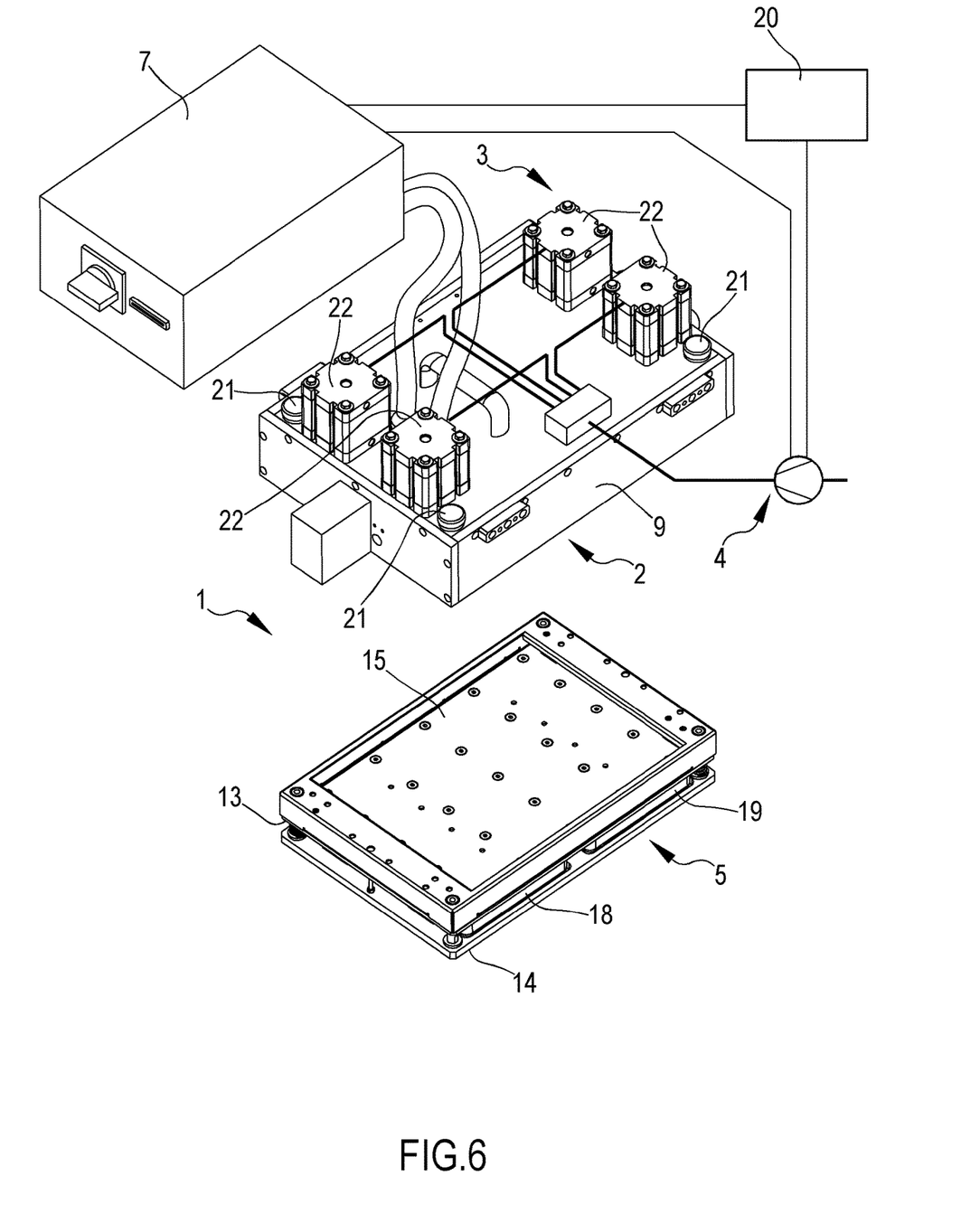
FIG. 6 is a partially exploded view of FIG. 5.

The heating and sealing head of the invention is shown in itself, in a possible embodiment thereof, in FIGS. 5 and 6, where it is indicated as a whole by numeral 1.

Such a heating and sealing head 1 of the invention is adapted to be expressly and exclusively installed on packaging machines of products in preformed trays, such as those shown in FIGS. 1 to 4 which, because they comprise such a heating and sealing head 1 herein exclusively claimed, form an integral part and object of the present invention.

Figure 1:
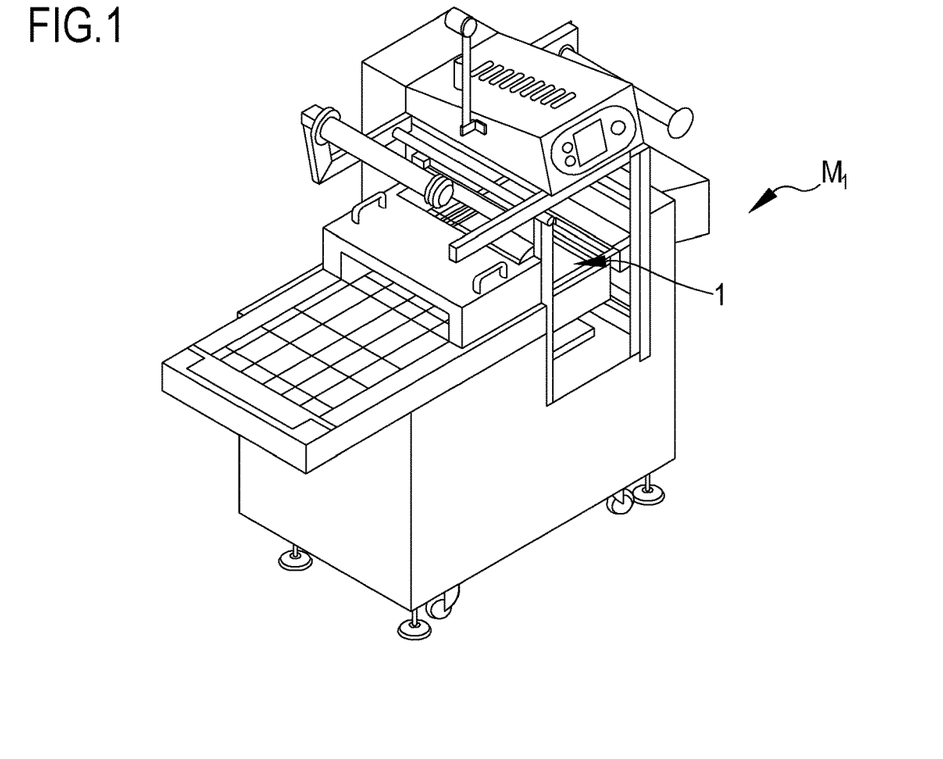
FIG. 1 is an axonometric view of a first packaging machine using the heating and sealing head of the invention.
Figure 2:
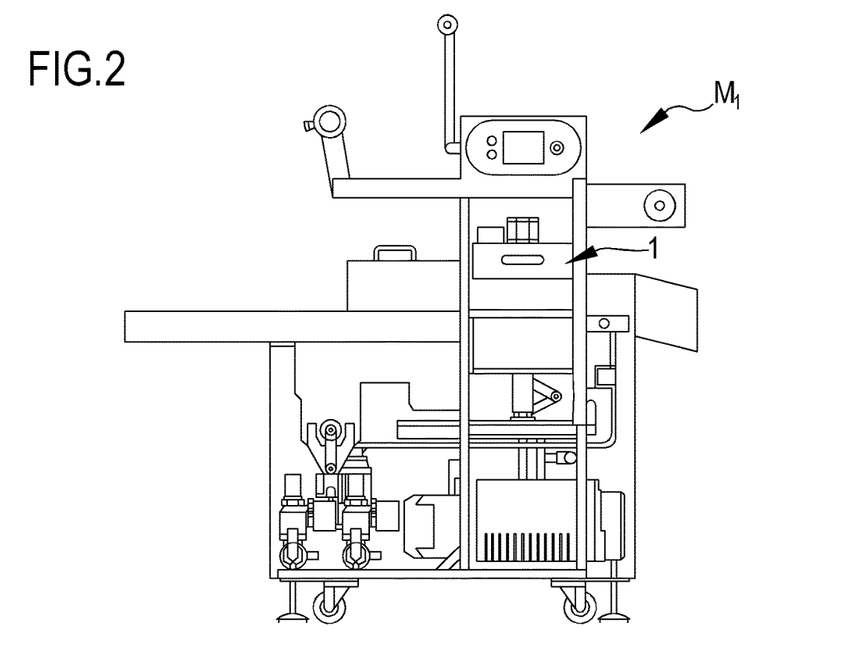
FIG. 2 is a side view of FIG. 1.

In particular, FIGS. 1 and 2 show a heat sealing packaging machine, indicated by $M_1$, of products in preformed trays: machine $M_1$ comprises the components and constructive assemblies indicated above, obviously in addition to the heating and sealing head 1 of the invention.

Figures 3, 4:
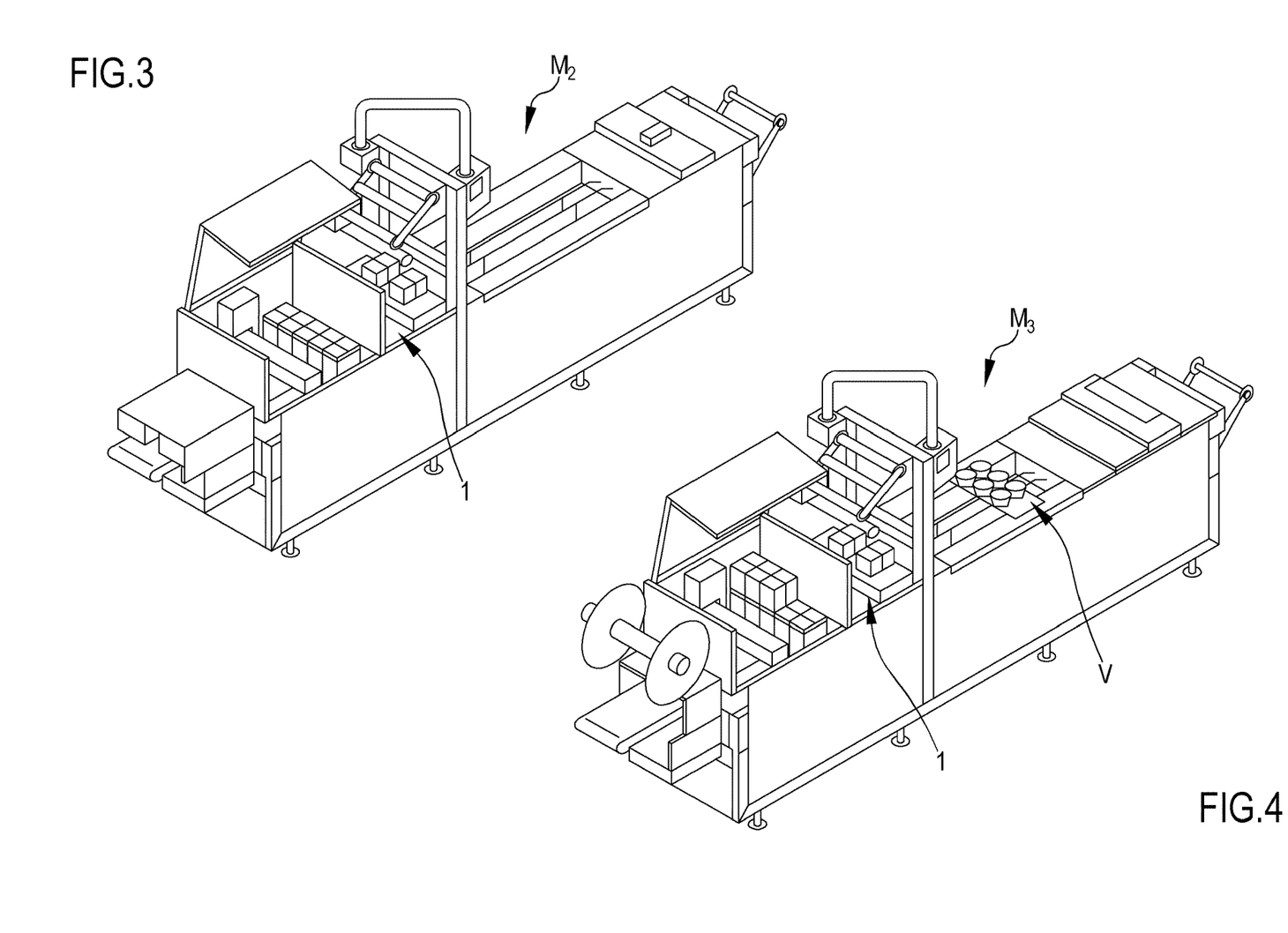
FIG. 3 is an axonometric view of a second packaging machine using the heating and sealing head of the invention.
FIG. 4 is an axonometric view of a third packaging machine using the heating and sealing head of the invention.

FIGS. 3 and 4 instead show two separate versions of a thermoforming machine for packaging products in trays V directly formed in the machine, indicated by $M_2$ and $M_3$, respectively, each of which includes the constructive components and assemblies indicated in the preceding pages of the present description, obviously in addition to the heating and sealing head 1 of the invention.

In addition to the components already described and the heating and sealing head 1 of the invention, this second type of packaging machine, indicated by $M_2$ and $M_3$ in the accompanying drawings, also comprises plates for preheating the film, which may be heated by induction: such preheating plates are always completely flat.

As noted in FIGS. 5 and 6, the heating and sealing head 1 comprises:
- a fixed support group, indicated as a whole by numeral 2, provided with actuation means, indicated as a whole by numeral 3, operatively connected to a pneumatic system, indicated as a whole by numeral 4, for delivering compressed air;
- a mobile application group, indicated as a whole by numeral 5, mechanically coupled to the fixed support group 2 by means of first fixing means, for simplicity of disclosure not shown in detail in the accompanying drawings, and comprising heating means, indicated as a whole by numeral 6, electrically connected to an electric current generator 7, in general preferably alternating, which, under operating conditions of head 1, activates the heating means 6 to produce heat useful for sealing, by thermal-fusion, a closing and packaging film (not shown, by way of example, completely made of plastic material, such as polypropylene, and originating from a reel or skein) to one or more trays (not shown and here preformed) for containing products when the latter, filled with product to be supplied to the user, are arranged under the heating and sealing head 1 in one of the packaging machines $M_1$, $M_2$ or $M_3$.

According to the invention, the heating means 6 here comprise a single electromagnetic inductor body 8 which produces the aforesaid heat due to the effect of the parasitic electric currents induced by a magnetic field generated by the electromagnetic inductor body 8 itself when crossed or affected by the electric current supplied by the electric current generator 7.

The basic components of the innovative induction heating system used in the heating and sealing head 1 of the invention therefore are the electric current generator 7, the electromagnetic inductor body 8, and advantageously and preferably, the load (that is, the component which is to be directly heated by such an electromagnetic inductor body 8 of the heating means 6 and which here consists of the intermediate heat storage plate 15 described below, belonging to the mobile application group 5).

The electric current generator 7 supplies the alternating electric current crossing the electromagnetic inductor body 8 (in the form of a series of reels made of metal material, as explained briefly below), thus generating a magnetic field thereabout. By arranging the load at a close distance, it is crossed by the so-called parasitic currents induced by such a magnetic field, which produce an accurate, localized and controllable increase in temperature in the material of the load, without there being any physical contact with the electromagnetic inductor body 8 (as instead necessarily occurs when employing electric resistances).

Figure 7:
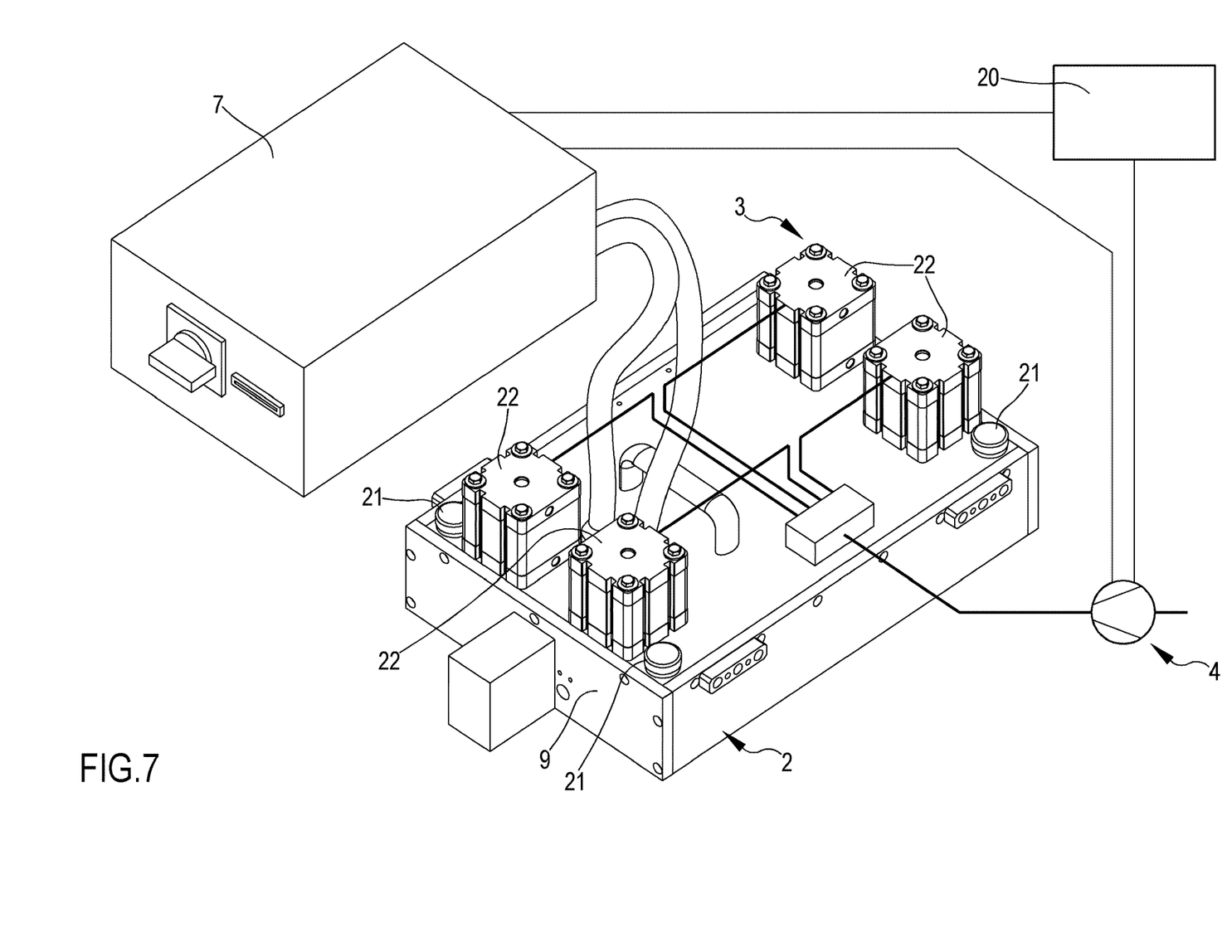
FIG. 7 is an axonometric view of a first constructive detail in FIG. 6.

In particular, the electromagnetic inductor body 8 is contained in a box-shaped element 9 belonging to the fixed support group 2 and also shown in FIG. 7.

Figure 8:
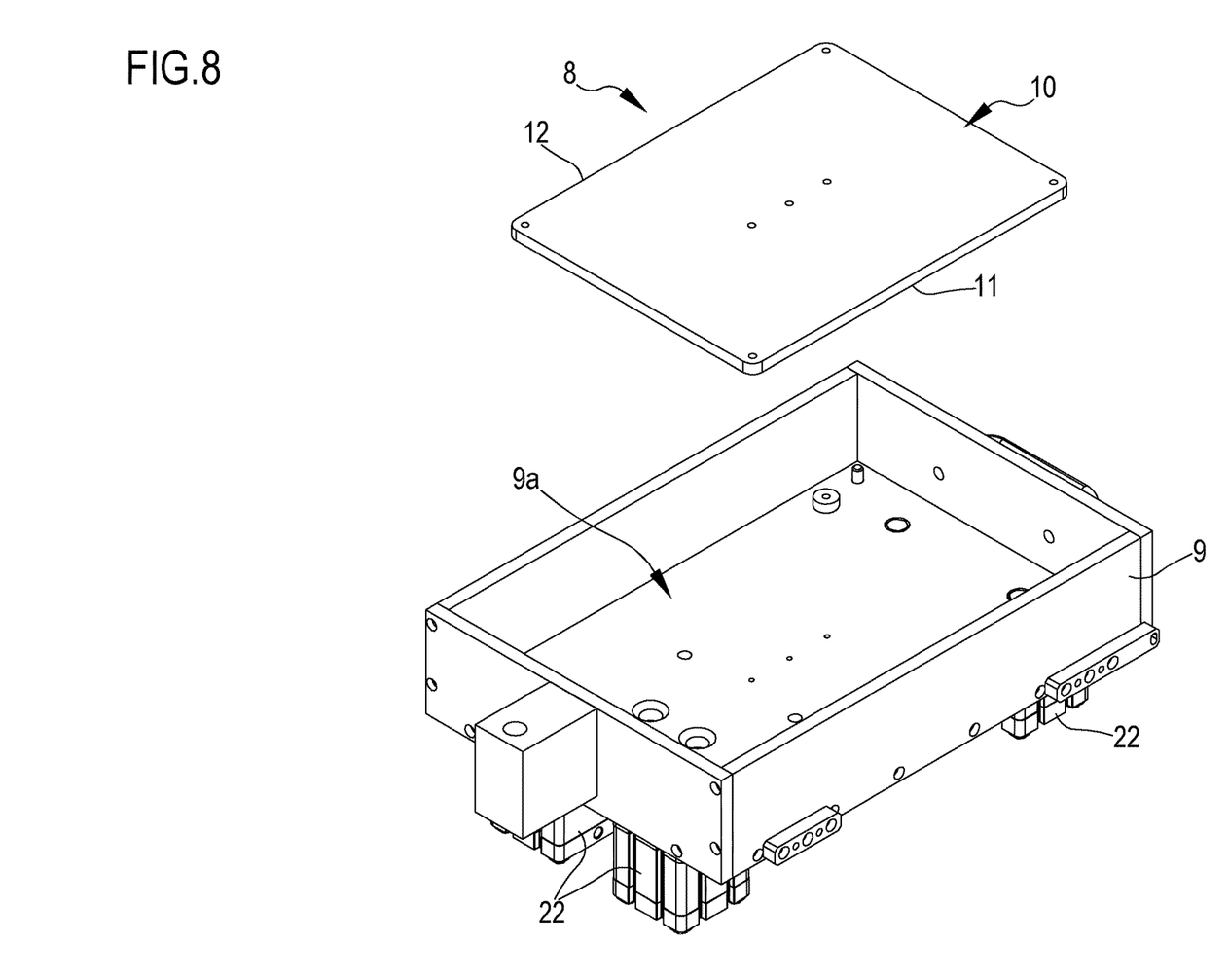
FIG. 8 is a simplified and exploded view of FIG. 7.

Preferably, but not necessarily, the electromagnetic inductor body 8 is fixed to the bottom wall 9a of such a box-shaped element 9 of the fixed support group 2, as shown in FIG. 8.

According to the preferred embodiment herein described of the invention, the electromagnetic inductor body 8 includes a composite assembly 10 of the sandwich type and having reduced overall dimensions, consisting of:
- a first laminar layer 11 made of thermally and electrically insulating material;
- a second laminar layer 12 made of thermally and electrically insulating material and parallelly spaced apart from the first laminar layer 11 by a prefixed, albeit minimum, distance which is not greater than 10 mm;
- a pair of coils (not shown) made of electrically conductive material, for example copper, interposed between the first layer 11 and the second layer 12 and electrically connected to the alternating current generator 7.

In a particular but non-limiting, although constructively suitable and advantageous manner, the first layer 11 and the second layer 12 of the composite assembly 10 are made of the same thermally and electrically insulating material, which for example consists of mica.

It is a non-negligible advantage with respect to the background art, the most pertinent of which being prior document EP0469296 A1, also in the different and peculiar constructive concept of the inductive component—here called electromagnetic inductor body 8—of the heating and sealing head 1 of the invention.

Indeed, the inductor body 8 in the heating and sealing head 1 of the invention firstly comprises more than a single elementary coil, unlike the inductor shown in EP0469296 A1, which provides only one thereof, with subsequent improved distribution or increased surface extension of the heat generated by induction at the load by head 1 of the invention with respect to such a prior art document, and the possibility of simultaneously packaging several preformed trays V.

Additionally, the coils in the inductor body 8 of the head 1 of the invention are arranged between the first laminar layer 11 and the second laminar layer 12 and therefore, they are not accommodated in an induction passage obtained in the mobile application group 5, as occurs instead in the sealing head (numbered 11) of prior document EP0469296 A1, where the only coil (numbered 71) is accommodated in an induction passage (numbered 88) necessarily obtained in the block (not numbered) on which a mounting plate (numbered 16) pushes from the top and which is surrounded by a cylindrical element (numbered 17).

As a result, the specific constructive concept of the above-described heating and sealing head 1 of the invention is somewhat simpler, at least at the inductor assembly, with respect to the one of the sealing head shown in EP0469296 A1. With regards to the mobile application group 5 of the heating and sealing head 1 of the invention, it is shown per se and enlarged in FIG. 9; it should be noted that it advantageously comprises an intermediate storage plate 15 directly facing, but separate from, the electromagnetic inductor body 8 and made here entirely of ferromagnetic material adapted to store the heat produced by the electromagnetic inductor body 8 itself: this explains that mentioned above, that is, that the intermediate storage plate 15 in the invention preferably is the load on which the electromagnetic inductor body 8 of the heating means 6 acts, unlike what is shown in prior document EP0469296 A1, in which the induction coil crossed by current (reference numeral 71) is directly in contact with the multilayer sealing and covering membrane (reference numeral 55) which is coupled to the lip (reference numeral 75) of the container (reference numeral 15) by melting the lower sealing layer (reference numeral 81) of the multilayer membrane itself.

Figure 9:
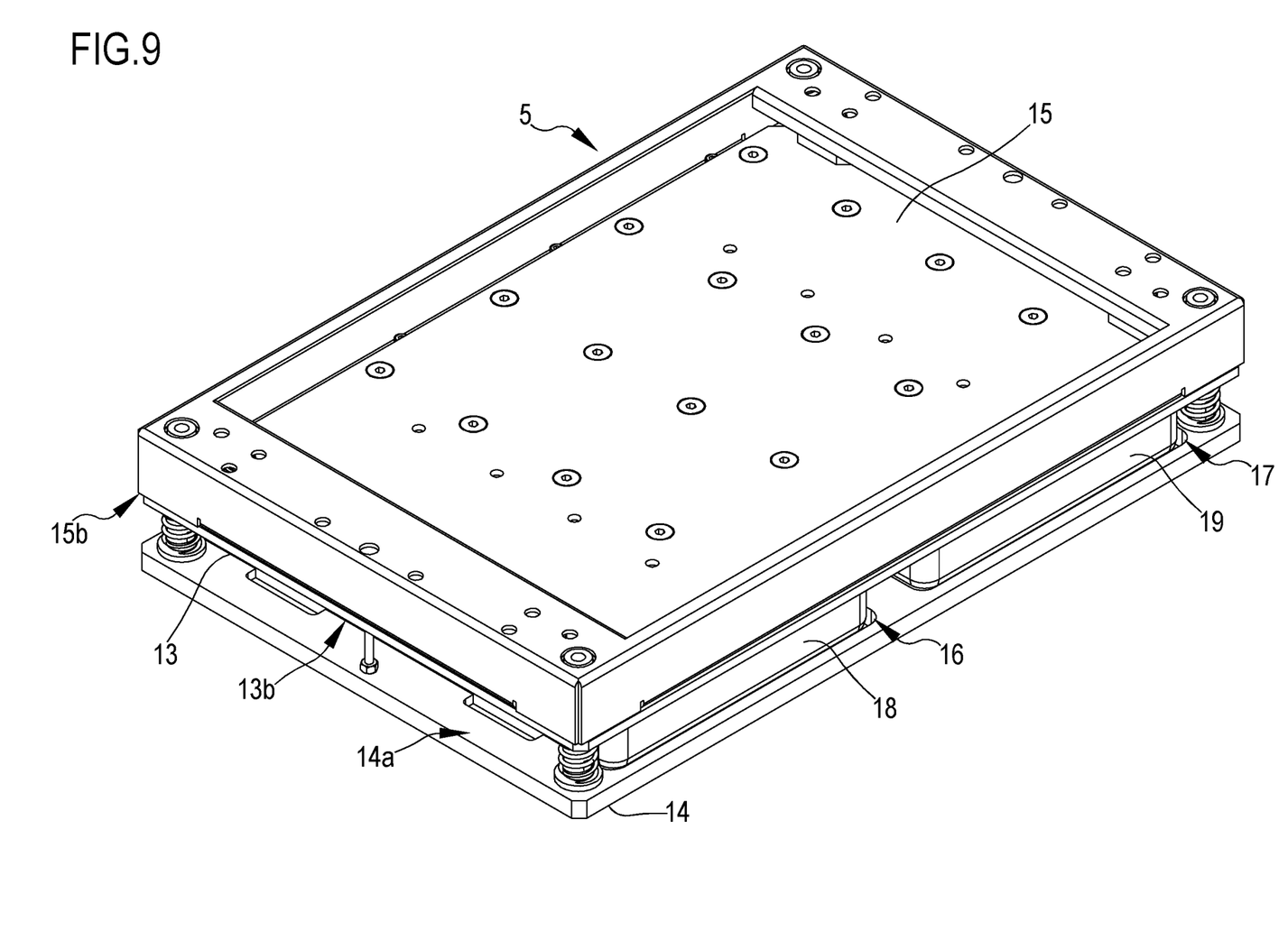
FIG. 9 is an axonometric view of a second constructive detail in FIG. 6.

The ferromagnetic material of the intermediate heat storage plate 15 is any one of the materials selected from the group consisting of stainless steel, nickel, cobalt, one of the transition metals and/or combinations thereof.

It is understood that in other embodiments of the heating and sealing head of the invention (not depicted below), the intermediate heat storage plate may be also only partly made of ferromagnetic material at a more or less raised surface layer thereof.

The presence of the intermediate heat storage plate 5 in the heating and sealing head 1 of the invention, in conjunction with a plurality of coils electrically connected to the alternating electric current generator 7, ensures a thermal inertia which is not detected in the prior art, in particular in document EP0469296 A1, which is rather useful in the sealing step because it allows a lesser electric energy load to be provided to the electromagnetic inductor body 8 than the one required to make the only induction reel (reference numeral 71) provided in the sealing head (reference numeral 11) of EP0469296 A1 operationally effective.

Figure 10:
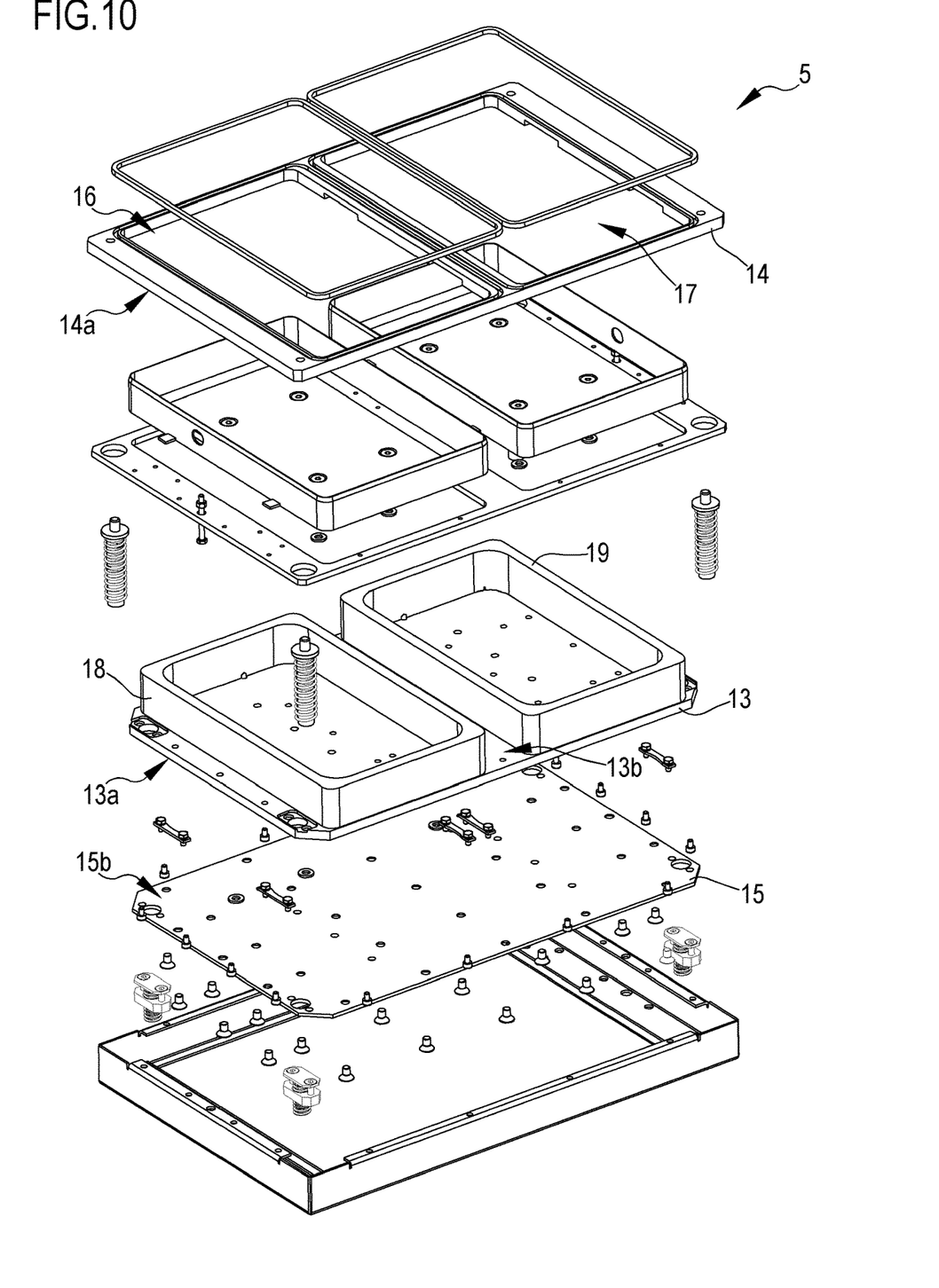
FIG. 10 is a more exploded axonometric view overturned by 180° of FIG. 5.

The mobile application group 5 also comprises a laminar thermal welding plate 13, best shown in FIG. 10, made of thermally conductive material, parallel and coaxially arranged, facing and spaced apart from the intermediate heat storage plate 15 to which it is stably coupled by means of second fixing means such as, for example screws (not numbered but shown in such FIG. 10).

In particular, the laminar thermal (or thermal-melting) welding plate 13 has an upper face 13*a* directly facing a lower face 15*b* of the intermediate heat storage plate 15, from which it is suitably separated only by means of an inner air chamber and from which it receives the heat by conduction.

The thermally conductive material with which the laminar thermal welding plate 13 is made preferably is aluminum.

Conveniently, although not necessarily, the mobile application group 5 also comprises a laminar locking (or abutment) plate 14 adapted to be arranged close to the closing and packaging film during the heat sealing step.

The laminar locking plate 14 has an upper face 14*a* directly facing a lower face 13*b* of the laminar thermal welding plate 13, and in this specific embodiment, a pair of through holes 16, 17 in each of which is engaged a respective raised annular rib 18, 19 which protrudes from the lower face 13*b* of the laminar thermal welding plate 13 (with which it is made in one piece or is monolithic) and from the locking plate 14.

The raised annular rib (or wedge) 18, 19 receives one of the preformed trays V to be packaged, provided with product therein to be used or consumed: as a result, the number of raised annular ribs (or wedges) in the laminar thermal welding plate corresponds to the number of preformed trays to be packaged in each individual packaging operation.

It is understood that further embodiments of the heating and sealing head of the invention not shown below may provide for the laminar locking plate to have a different number of through holes (as in turn, the laminar thermal welding plate may have a different number of raised annular ribs), such a number being variable according to construction needs, starting from one: in any case, generally there are no more than four through holes, which corresponds to a congruous number of preformed trays V which may be processed in each individual packaging cycle of the heating and sealing head 1 of the invention mounted on packaging machines.

By way of preferred but non-exclusive example, the mobile application group 5 also includes a laser pyrometer adapted to measure and control the temperature of the laminar thermal welding plate 13, namely of the raised annular ribs (or wedges) 18 and 19: such a pyrometer is arranged on the external surface of a perimeter frame of the mobile application group 5.

Essentially, a laser pyrometer useful for measuring and controlling the temperature, and which beam reads the temperature, preferably, of the external surface of the raised annular ribs (or wedges) 18 and 19, is fixed on the external box-like structure of the mobile application group 5.

Preferably, but not necessarily, the mobile application group 5 is removably coupled to the fixed support group 2 to allow maintenance operations on the fixed support group 2 itself and/or on the mobile application group 5, and also advantageously format change operations of the mobile application group 5 according to the number of preformed trays to be packaged (such a number depending on the format thereof, considering that the maximum width and length dimensions of the heating and sealing head 1—which are determined by the fixed support group 2—do not vary): This, contrarily to that noted in prior document EP0469296 A1, which mentions nothing on the subject.

In this regard, it should be noted that the first fixing means introduced above comprise any one of the mechanical coupling systems such as to allow the stable but removable coupling of the mobile application group 5 to the fixed support group 2, and they are provided with a plurality of outwardly protruding operating knobs 21 (four in the accompanying drawings).

Each of such operating knobs 21 can be operated by an operator to alternately arrange the first fixing means in the operating position, in which they stably couple the mobile application group 5 to the fixed support group 2, and in the release position, in which the first fixing means uncouple the mobile application group 5 from the fixed support group 2 to allow, as mentioned, maintenance operations on the two assemblies involved (notably the components thereof) and/or format change operations of the mobile application group 5 according to the number (consequence of the dimensions or format thereof) of preformed trays to be packaged.

Other solutions of the heating and sealing head for packaging machines of the invention (not accompanied by reference drawings) may also have a different number of operating knobs than the preferred number, which is described and shown in the accompanying drawings, such a number being variable starting from one according to the construction selections.

Additionally, according to construction practice, the mobile application group 5 is usually contained in the overall dimensions of the fixed support group 2 from which it is caused to at least partially axially protrude from the actuation means 3 during the sealing step of the closing and packaging film to the underlying preformed trays V.

More precisely, as FIGS. 5 to 7 show, the actuation means 3 comprise a plurality of pneumatic linear actuators 22, each of which operatively connected to the pneumatic system 4, adapted to move the mobile application group 5 with respect to the fixed support group 2 along an axial coupling direction between the mobile application group 5 and the fixed support group 2 so as to arrange the raised annular rib 18, 19 of the second laminar plate 14 close to the closing and packaging film for the useful time to seal it to underlying preformed trays through the heat transferred to the pair of laminar thermal welding plates 13, 14 (first by induction by the electromagnetic inductor body 8 to the intermediate heat storage plate 15 made of ferromagnetic material, and then by conduction by such an intermediate heat storage plate 15 to the pair of laminar thermal welding plates 13, 14).

Finally, it should be noted that the pneumatic system 4 and the electric current generator 7 are electrically connected to a central processing and control unit 20 which manages the operation thereof and which is available to an operator by means of a control panel (not depicted for the sake of simplicity of disclosure).

In light of the description provided above, it's therefore understood that the heating and sealing head (or cylinder-head) for packaging machines of products in trays of the present invention achieves the objects and advantages indicated above.

Significant modifications could be made to the heating and sealing head for packaging machines of products in trays of the invention in the execution step, consisting for example, of a different number of electromagnetic inductor bodies than that described above and shown in the accompanying drawings, such a number being variable according to the construction selections starting from one. The pneumatic system for delivering compressed air of the heating and sealing head of the invention may also include a vacuum pump for obtaining (for example, preformed) vacuum-packed trays containing the product of interest to the user.

Finally, it is apparent that several other variants may be made to the heating and sealing head for packaging machines of products in trays at hand, without departing from the principles of novelty inherent to the inventive idea, just as it is apparent that any materials, shapes and sizes of the details disclosed in the practical implementation of the invention may be implemented according to needs and may be replaced by other technically equivalent ones.

Where the construction features and techniques mentioned in the subsequent claims are followed by reference signs or numerals, such reference signs were introduced for the sole purpose of increasing the intelligibility of the claims themselves, and therefore such reference signs have no limiting effect on the interpretation of each element identified by way of example only by such reference signs.

The invention claimed is:

1. Heating and sealing head for packaging machines ($M_1$, $M_2$; $M_3$) of products in trays (V), comprising:
    a fixed support group provided with actuation means operatively connected to a pneumatic system for delivering compressed air;
    a mobile application group, mechanically coupled to said fixed support group through first fixing means and comprising heating means electrically connected to an electric current generator which activates said heating means to produce heat useful for sealing a closing and packaging film to one or more trays for containing products when said trays are arranged under said heating and sealing head in a packaging machine,
    wherein said heating means comprise at least one electromagnetic inductor body which produces said heat due to the effect of the parasitic electric currents induced by a magnetic field generated by said electromagnetic inductor body when crossed or affected by said electric current supplied by said electric current generator,
    wherein said mobile application group comprises an intermediate heat storage plate directly facing and separated from said electromagnetic inductor body and made at least at a surface layer made of ferromagnetic material adapted to accumulate said heat produced by said electromagnetic inductor body.

2. Head according to claim 1, wherein said electromagnetic inductor body is contained in a box-shaped element belonging to said fixed support group.

3. Head according to claim 1, wherein said electromagnetic inductor body is fixed to the bottom wall of a box-shaped element belonging to said fixed support group.

4. Head according to claim 1, wherein said electromagnetic inductor body includes a composite assembly of the sandwich type consisting of:
    a first laminar layer made of thermally and electrically insulating material;
    a second laminar layer made of thermally and electrically insulating material and parallelly spaced apart from said first laminar layer by a prefixed distance;
    a plurality of reels made of conductive material, interposed between said first layer and said second layer and electrically connected to said electric current generator.

5. Head according to claim 4, wherein said first layer and said second layer of said composite assembly are made of the same thermally and electrically insulating material and said thermally and electrically insulating material consists of mica.

6. Head according to claim 1, wherein said ferromagnetic material is any of the materials selected from the group consisting of stainless steel, nickel, cobalt, one of the transition metals and/or combinations thereof.

7. Head according to claim 1, wherein said mobile application group comprises a laminar thermal welding plate made of a thermally conductive material, parallel and coaxially arranged, facing and spaced apart with respect to said intermediate heat storage plate to which it is coupled by means of second fixing means, such that said laminar welding plate has an upper face directly facing a lower face of said intermediate heat storage plate, from which it is separated by an inner air chamber.

8. Head according to claim 7, wherein said thermally conductive material of said laminar thermal welding plate is aluminum.

9. Head according to claim 7, wherein said mobile application group comprises a locking plate adapted to be arranged close to said closing and packaging film and having an upper face directly facing a lower face of said laminar thermal welding plate and one or more through holes in each of which a raised annular rib is engaged which protrudes from said lower face of said laminar thermal welding plate and from said locking plate and is adapted to receive one of said trays to be packaged.

10. Head according to claim 9, wherein said mobile application group includes a laser pyrometer adapted to measure and control the temperature of said laminar thermal welding plate, arranged on the external surface of a perimeter frame of said mobile application group.

11. Head according to claim 10, wherein said actuation means comprise a plurality of pneumatic linear actuators each of which operatively connected to said pneumatic system, adapted to move said mobile application group with respect to said fixed support group along an axial coupling direction between said mobile application group and said fixed support group so as to arrange said raised annular rib of said laminar thermal welding plate close to each of said underlying trays to be packaged for the time needed to apply by sealing said closing and packaging film to said trays by means of said heat transferred to said laminar thermal welding plate.

12. Head according to claim 1, wherein said mobile application group is removably coupled to said fixed support group.

13. Head according to claim 1, wherein said first fixing means comprise any one of the mechanical coupling systems such as to allow the stable but removable coupling of said mobile application group to said fixed support assembly, and they are provided with at least one operating knob which can be operated by an operator to alternately arrange said first fixing means in the operating position, in which they stably couple said mobile application group to said fixed support group, and in the release position, in which they uncouple said mobile application group from said fixed support group to allow maintenance and/or format change operations of said mobile application group according to the number and/or format of said trays to be packaged.

14. Head according to claim 1, wherein said mobile application group is at least partially contained in the overall dimensions of said fixed support group from which it is caused to at least partially protrude by means of said actuation means during the sealing step of said closing and packaging film to said underlying trays.

15. Head according to claim 1, wherein said pneumatic system and said electric current generator are electrically connected to a central processing and control unit available to an operator by means of a control panel.

\* \* \* \* \*